March 31, 1959      H. SURTEES      2,880,384
FEED BACK CONTROL SERVOSYSTEMS
Filed Feb. 13, 1957      3 Sheets-Sheet 1

INVENTOR
HOWARD SURTEES

March 31, 1959    H. SURTEES    2,880,384
FEED BACK CONTROL SERVOSYSTEMS
Filed Feb. 13, 1957    3 Sheets-Sheet 2

INVENTOR
HOWARD SURTEES

United States Patent Office 2,880,384
Patented Mar. 31, 1959

2,880,384

FEEDBACK CONTROL SERVOSYSTEMS

Howard Surtees, Hayes, England, assignor to Fairey Aviation Company Limited, Hayes, England, a company of Great Britain Application February 13, 1957, Serial No. 639,984

Claims priority, application Great Britain February 14, 1956

15 Claims. (Cl. 318—448)

This invention relates to feedback control systems that is to say control systems arranged to produce a response to an input signal and including a feed-back path arranged to supply to the input a signal dependent upon the response.

In practically all systems there will be certain frequencies at which the feedback signal will be in phase with the input signal and if the loop gain is as great as unity at any of these frequencies, oscillation of that frequency will tend to be generated in the system.

Now it is desirable that the loop gain, that is the product of the gains due to the individual components in the complete loop, should be as high as possible at the frequencies to be used in order to achieve accurate response and to render the response substantially independent of changes in the components. However an increase in gain at working frequency will generally also increase the gain at one of the self-oscillation frequencies. In a system having a self-oscillation frequency the maximum loop gain before self-oscillation occurs may be termed the stability limit.

By the incorporation of suitable filters it may be possible to modify the system characteristics to decrease the gain at a self-oscillation frequency and thus to increase the stability limit.

It is the usual practice to design the system to operate with a loop gain rather below the stability limit. In some applications, for example the control of aircraft, the stability limit varies during operation due to changes in external conditions, for example aircraft speed and altitude, and in such a case the system is designed to operate well below the estimated minimum stability limit to allow for mis-estimations. It may also be necessary to provide means for varying the loop gain in response to variations in such external conditions, thus complicating the system.

It is an object of the present invention to provide a feed-back control system capable of operating nearer to the stability limit and without many additional complications.

According to one aspect of the present invention a feed back control system designed to operate over a range of working frequencies includes a variable-gain element in the feed back loop, and a sensing element responsive to the loop gain of signals in the loop at a sensing frequency outside the working range, the sensing element being arranged to control the variable gain element so as to reduce the loop gain at both operating and sensing frequencies when the loop gain at the sensing frequency rises.

In one arrangement means is provided for injecting a signal at sensing frequency into the loop and for withdrawing a similar signal from the loop after passing completely round the loop, and the sensing element comprises means for comparing the two signals and controlling the variable gain element in accordance with their relationship.

Conveniently the signal is injected into the loop at the same point as the demand signal enters the loop and is withdrawn from the fed-back path.

In an alternative arrangement, in which the sensing frequency is a frequency at which the loop tends to oscillate, the sensing element is arranged to respond to oscillation so as to reduce the gain of the variable gain element when the loop gain at the sensing frequency exceeds unity and oscillation occurs.

Thus according to one form of the present invention a feed-back control system includes a variable-gain element controlled by a unit responsive to oscillations in the feed-back loop to reduce the loop gain to tend to keep it at the value at which oscillations remain small. The variable-gain element may be in the forward or the feed-back part of the loop.

Thus the unit may extract a control signal from the loop, and pass it through a band-pass filter having a pass band including the lowest natural oscillation frequency of the loop, to produce, for example after rectification and smoothing, a signal which can be used to control the variable-gain element, which may be a variable-gain amplifier. Thus oscillation in the loop produces a control signal, e.g. a voltage, which reduces the gain of the variable-gain element. As the amplitude of oscillation increases the gain is reduced tending to prevent further increase of oscillation until a steady state is reached in which the small oscillations are sufficient to keep the loop gain at that value.

The control signal may be a direct signal proportional to the oscillation amplitude or it may be a more complicated function of the amplitude, for example a decaying integration so that the longer oscillations persist the greater will the control signal become, while when the oscillations cease the control signal will decay to zero.

An input filter may be arranged to extract from input signals any frequencies which would be passed by the oscillation filter in order that components of the input signal cannot vary the gain.

According to another aspect of the invention the system may include means for injecting a signal of a certain frequency as an input, a filter passing that frequency for extracting that signal after it has been subjected to the loop gain, and means arranged to control the gain of a variable-gain element in the loop in accordance with the relationship between the injected input and the filter output. For example, these two quantities, or predetermined proportions of one or both, may be applied in opposition to the control electrode of a valve in, or connected to control, the variable-gain element.

Thus, a signal at the lowest self-oscillation frequency may be injected as an input to the system and extracted, after being subjected to the loop gain, as a control signal for the variable-gain element to keep the loop gain at this frequency at any desired value below unity.

Again, a signal at some other frequency, at which the loop gain is related to the loop gain at the lowest self-oscillation frequency, may be injected as an input and extracted, after being subjected to the loop gain, as the control signal to keep the loop gain at the injected frequency at a value such that the loop gain at the lowest self-oscillation frequency is at a desired value below unity.

The system may include a network which changes the characteristics of the system to increase the self-oscillation frequency to a frequency far removed from the range of frequencies to be used, and/or to reduce the loop gain at the self-oscillation frequency, or both.

Although applicable to feedback control systems generally, for example purely electrical amplifiers, the invention is particularly applicable to servo mechanisms, that is to say feedback control systems having at least one mechanical link in the loop.

Thus, the invention is particularly applicable to the deflection of aircraft control surfaces, for example the rudder in response to radio input signals. In such a case the feedback might comprise a signal which is a function of the lateral acceleration of the aircraft produced by the rudder deflection due to a demand signal.

It can be shown that the angle of incidence of the wings in a turn is proportional to the demand signal producing the turn under certain conditions and accordingly a demand signal limiter may be included arranged to limit the maximum value of the demand signal so that the angle of incidence is also limited and the tendency of the missile to stall can be reduced, even in a slow turn.

The invention may be carried into practice in various ways but one specific embodiment and a modification thereof will be described by way of example with reference to the accompanying drawings, in which.

Figure 1:
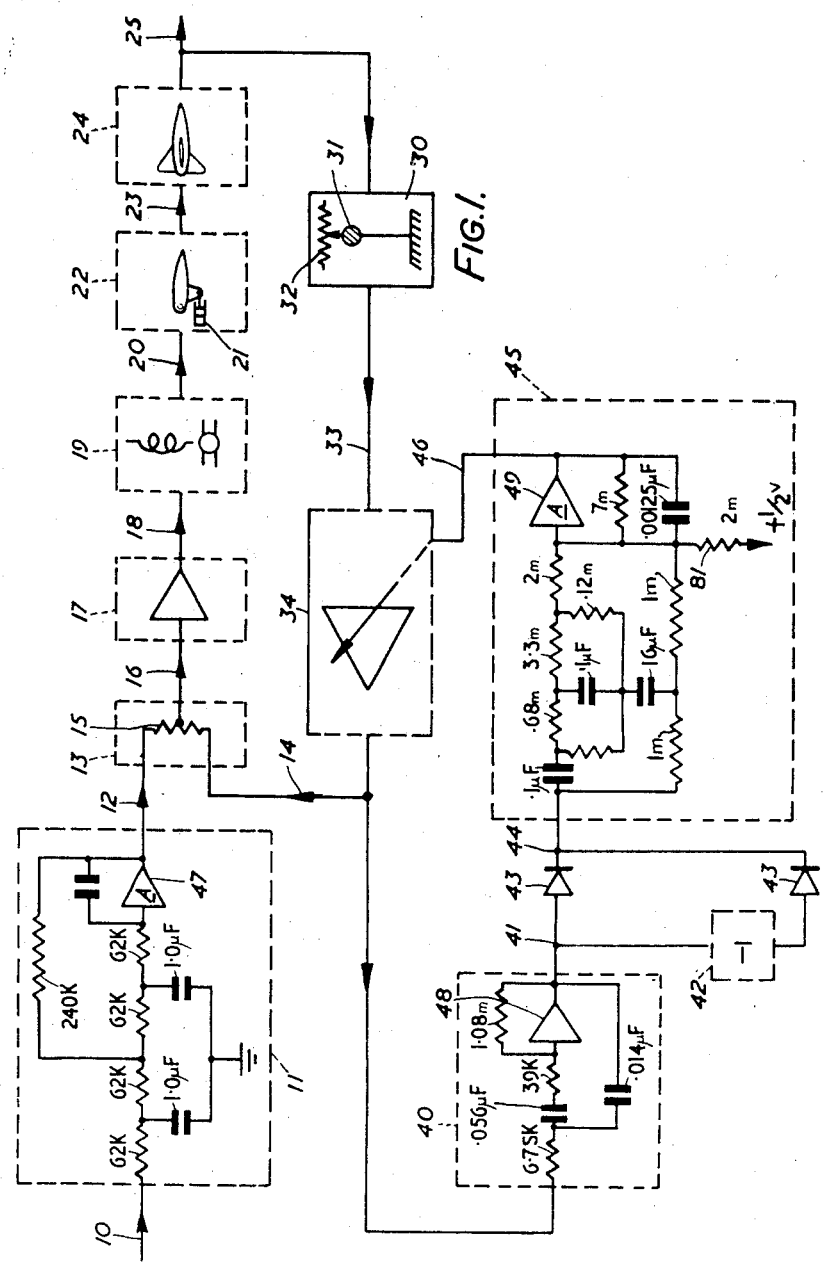
Figure 1 is a block diagram of a servo-system.

The servo system indicated diagrammatically in Figure 1 is applicable in principle to a wide variety of requirements but will be particularly described as applied to the control of an aircraft in accordance with a radio signal. For example where an aircraft is required to fly along a beam, a receiver in the aircraft may pick up the radio signal from the beam which will be zero when the aircraft is on the centre of the beam, but will increase in one direction or the other as the aircraft deviates from the centre of the beam. Alternatively the signal may be controlled at will by a distant operator. This demand signal is amplified to control an electro-pneumatic relay valve which, in turn, controls the supply of pressure fluid to a pneumatic ram operating the rudder of the aircraft.

In order to ensure accuracy of response feed-back is provided so that the parts described are included in a servo loop. Thus the aircraft is fitted with an accelerometer, which, for example by controlling a potentiometer, given an electrical output corresponding to the lateral acceleration produced by the rudder. This electrical output is amplified and fed back to the input to the amplifier in opposition to the demand signal. In accordance with well known practice this ensures that the lateral acceleration is proportional to the demand signal provided the feedback gain is constant and the loop gain is high.

In accordance with the invention the gain of the feed back amplifier is automatically reduced in accordance with any oscillation occurring at the natural oscillation frequency of the loop, that is to say the frequency at which the loop first becomes unstable as the loop gain is gradually increased.

Thus, as shown in Figure 1 the demand signal 10 is applied to a low pass filter 11, described in more detail below, whence the filtered output is supplied as one input 12 of an adding unit 13 to which a feed back signal 14 is supplied as a second input. The adding unit 13 adds the feed back signal to the demand signal, for example it may simply comprise a tapped resistor 15 having the signals 12 and 14 supplied to opposite ends of it whilst the tapping constitutes the output 16 to the operating means. The operating means comprise a forward amplifier 17 whereof the output 18 controls an electrically operated valve 19 controlling the supply 20 of actuating fluid to a ram 21 actuating the rudder 22. The deflection of the rudder, represented by the output 23 acts on the aircraft 24 to produce lateral acceleration represented by the output 25 in accordance with the transfer function of the aircraft dependent upon mechanical conditions such as the speed of the aircraft, the dimensions of the rudder and the density of the air. Hence the output 25 representing the effect to be produced, namely lateral acceleration of the aircraft, may depend upon a variable transfer function or gain in the forward portion of the loop from the demand signal 10 to the output signal or lateral acceleration 25.

The feed-back portion of the loop comprises an accelerometer 30 indicated diagrammatically as a bob-weight 31 operating a potentiometer 32. This is arranged to respond to the lateral acceleration 25 of the aircraft and serves to produce an electrical output 33 forming the input to a variable gain feed-back amplifier 34 of which the output 14 is returned to the adding unit 13 as already described.

In accordance with the present invention the output 14 from the variable gain amplifier 34 is also passed to a band pass filter unit 40 designed to pass a narrow band of frequencies including the natural oscillation frequency of the servo loop, that is to say the frequency at which the loop first becomes unstable as the loop gain is gradually increased. The output 41 from the band-pass filter is rectified by means of a phase inverter 42 and a pair of diodes 43 together constituting a full wave rectifier. The rectified output 44 is connected to a low-pass smoothing filter and phase advance network 45 whence the output 46 constitutes a smoothed control signal which is supplied to the variable-gain feed-back amplifier 34 to control its gain.

Figure 2:
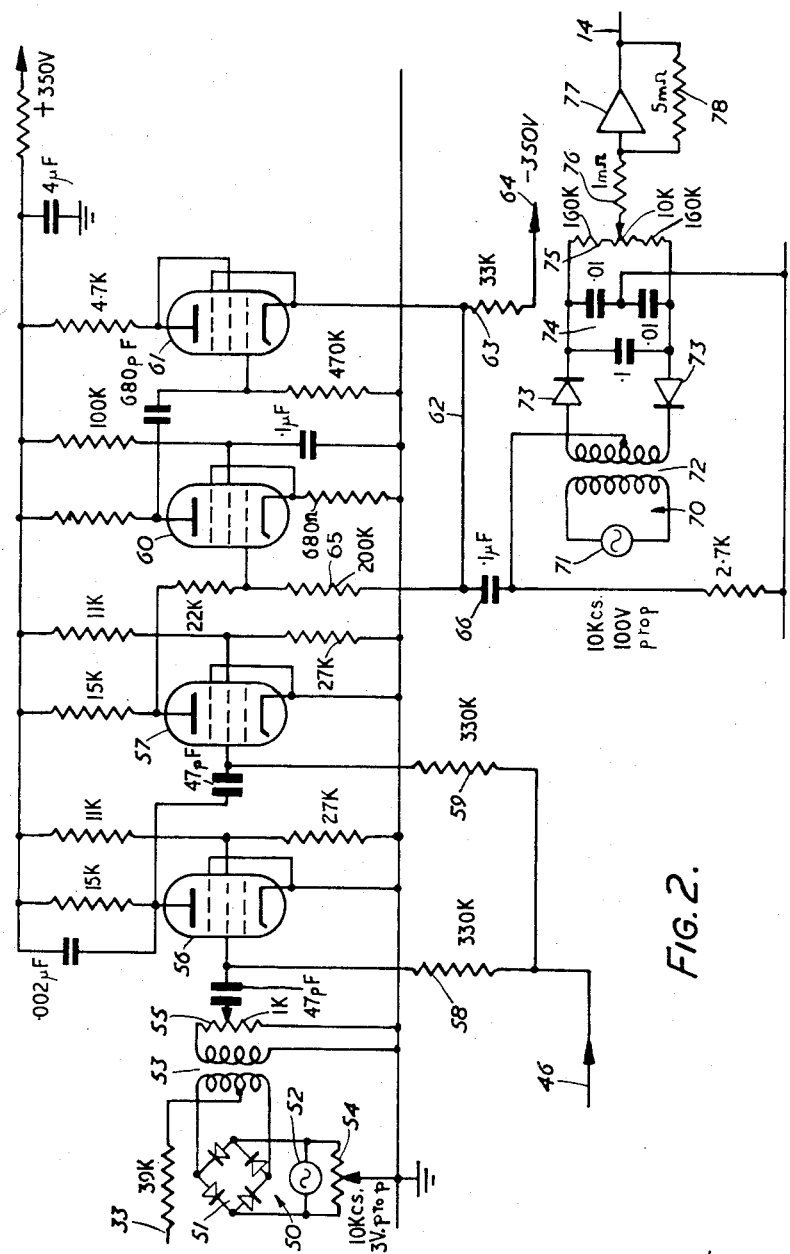
Figure 2 is a circuit diagram of the variable gain feed-back amplifier.

A suitable circuit for the variable-gain feed-back amplifier 34 is shown in Figure 2 in which it will be seen that the input 33 is modulated by a modulating circuit 50 including a diode ring modulator 51 fed from a carrier supply 52 and connected to a transformer 53. The input 33 is connected to a tapping of the primary winding of the transformer 53 whilst the tapping of a potentiometer 54 connected across the supply is connected to earth so as to provide a preliminary coarse adjustment. The secondary winding of the transformer 53 is connected by a potentiometer 55 providing further adjustment to the input of a valve 56. The valve 56 and a second valve 57 are connected in a conventional manner, their grid bias being controlled in order to vary their gain by connecting their control grids through grid bias resistors 58 and 59 to receive the gain control signal 46. The amplifier includes two further valves 60 and 61 whereof the former is a conventional amplifier and the latter is arranged as a cathode follower with its cathode connected to an output line 62 and through a resistor 63 to a negative supply 64.

In order to decrease the output impedance of the cathode follower, feed-back is provided to the input of the valve 60 by means of a resistor 65 connected between the control grid of the valve 60 and the output lead 62 of the cathode follower 61.

The output lead 62 from the cathode follower is connected through a capacitor 66 to a demodulating circuit 70. This comprises a supply 71 synchronised with the supply 52 connected to the primary winding of a transformer 72 whereof the secondary winding has a centre tapping connected to the capacitor 66 whilst its ends are connected through diodes 73 to opposite terminals of a capacitor potential divider 74 and a resistor potential divider 75 whereof the tapping 76 constitutes the output.

The operation of the demodulator occurs in known manner. Thus when no signal is received through the capacitor 66 from the cathode follower the currents passed through the diodes 73 from the supply 71 are equal and hence the tapping of the capacitor potential divider 74 is mid-way between the potentials of its ends, and is equal to the potential of the tapping of the resistor potential divider 75. If, however, a signal is received through the capacitor 66 it will reinforce that due to the supply 71 in one half of the secondary winding of the transformer 72 and tend to balance out the current in the other half, so that the current through one of the diodes 73 will exceed that through the other diode, the capacitor potential divider 74 will be unbalanced so that earth potential is no longer mid-way between the potentials of the two ends of the potential dividers and hence the potential of the output 76 moves one way or the other depending upon the phase of the signal from the cathode follower in relation to that of the supply 71.

The output 76 is fed back to the adding unit 13 through an isolating unit consisting of a high gain amplifier 77 provided with a feed back circuit 78 serving to provide the necessary transfer function.

The invention is not restricted to any particular component values, but suitable values for one specific embodiment are shown in Figure 2 and it is thought unnecessary to refer to the circuit in greater detail.

The low pass input filter 11, the bandpass filter 40 and the smoothing filter and phase advance network filter 45 may be designed in accordance with known filter circuit technique. Suitable arrangements for a specific embodiment are shown in Figure 1 in which component values are marked, and it is thought unnecessary to describe the circuits in detail. In each case it will be noted that the network feeds a high-gain amplifier, 47, 48, or 49, provided with a feed-back loop to provide the necessary transfer function.

In the specific embodiment in question the feed-back look has an oscillation frequency of about 22 cycles per second.

The low pass input filter 11 has a transfer function of the form $$\frac{1}{1+ap+bp^2+cp^3}$$

cutting off at about two cycles per second. In this and following expressions for transfer functions $p$ is the Laplace operator and other letters $a, b, c, d, A, B, T_1, T_2$ represent constant coefficient to suit the particular design.

The band pass filter 40 has a transfer function of the form $$\frac{p}{1+dp+p^2}$$

and serves to pass a narrow band of frequencies on either side of twenty-two cycles per second. The smoothing filter 45 includes a low pass filter serving to smooth the ripple from the full wave rectifier, having a transfer function of the form $$\frac{1}{1+pT_1}$$

and arranged to cut off at a very low frequency, for example at about 0.2 cycle per second. Connected in parallel with this low pass smoothing filter is a circuit functioning as a phase advance network having a transfer function of the form $$\frac{1}{1+dp+p^2}$$

serving to advance signals having a frequency below about 2 cycles per second, but to attenuate and lag signals at higher frequencies. This phase advance network serves in known manner as stabilizing network for the automatic gain control loop. These networks are followed by another low-pass filter having a transfer function of the form $$\frac{1}{1+pT_2}$$

arranged to provide additional smoothing. This may have a cut off at about ten cycles per second.

The combined smoothing and phase advance network 45 has a transfer function of the form $$\left(\frac{A}{1+pT_1}+\frac{Bp}{1+dp+p^2}\right)\frac{1}{1+pT_2}$$

It may be noted that this circuit includes a bias resistor 81 connected to a point at a potential of about ½ volt positive with respect to earth in order to provide a steady grid potential of about 2 volts negative with respect to earth for the first two valves 56 and 57 of the variable gain feed-back amplifier.

It is believed that the operation of the device will be clear from the above description. When a demand signal is received at the input 10 it will be amplified and serve to initiate movement of the rudder, thereby producing lateral acceleration of the aircraft represented by the output 25. The amplification of the forward part of the servo loop is such that the lateral acceleration would be grossly excessive were it not for the feed-back portion of the loop which supplies the usual balancing signal at the output 14 of the feed-back amplifier 34 so that when the lateral acceleration reaches a value corresponding with the demand signal at the input 10 no further movement of the rudder will take place. It is known that in order to ensure accurate proportionality between the lateral acceleration produced and the demand signal producing it, the loop gain should be a maximum. It is, however, also well known that even if the circuit is arranged so that the feed-back signal will be in phase opposition to the demand signal at certain frequencies (in particular at very low frequencies) there will be other frequencies at which a phase displacement has occurred round the loop so that the feed-back signal will reinforce the demand signal and if the total loop gain of this frequency exceeds unity, the loop will be unstable and liable to burst into oscillation.

The present arrangement meets this difficulty by providing that any such oscillation will automatically reduce the loop gain. The oscillating signal for this purpose may be tapped off at any point in the loop and in the example given it is taken from the output 14 of the variable-gain feed-back amplifier 34. As indicated above in the particular circuit shown the frequency at which the stability limit will be reached is about 22 cycles per second, and accordingly if the loop gain is such that the loop is going to oscillation it will first do so at this frequency. The moment it starts to do so a signal will be passed through the band-pass filter 40 which, as indicated above, is designed to pass this frequency and to reject other frequencies. The signal is smoothed and ultimately applied to the output 46 so as to vary the bias on the first two valves 56 and 57 of the variable gain feed-back amplifier 34. Accordingly the loop gain is immediately reduced until the oscillation subsides to a predetermined level.

This system has several advantages. Thus the loop, gain and hence the accuracy of the system will be automatically maintained substantially as high as possible, while this is carried out without complicated additional apparatus such as gain-shaping networks and units whose gain is controlled by external conditions. The minimum stability limit likely to arise in practice does not have to be estimated in design and a tolerance for misestimation does not have to be allowed. The components do not need to be carefully preadjusted while changes in component performance may be automatically compensated for.

It can be shown that under certain circumstances the lateral acceleration of the aircraft for a given radio-steering signal is proportional to the air density and to the square of the forward speed. Hence it follows that at a fixed air density the radius of turn of the aircraft and angle of incidence of its wings for a certain demand signal remain constant over the expected speed range.

Thus the system may include a signal limiter on the input side of the adder for limiting the maximum demand signal to a value corresponding to an angle of incidence estimated to be insufficient for the aircraft to stall.

It may also be shown that the lateral acceleration at a given speed is substantially proportional to the signal producing it provided the loop gain is very much greater than unity. Thus the transfer gain of the rudder actuator and of the aircraft in response to rudder movement are not of great importance provided the loop gain is high enough as will be automatically arranged in accordance with the invention.

It can also be shown that at constant altitude the radius of a turn is inversely proportional to the magnitude of the signal producing it.

Figure 3:
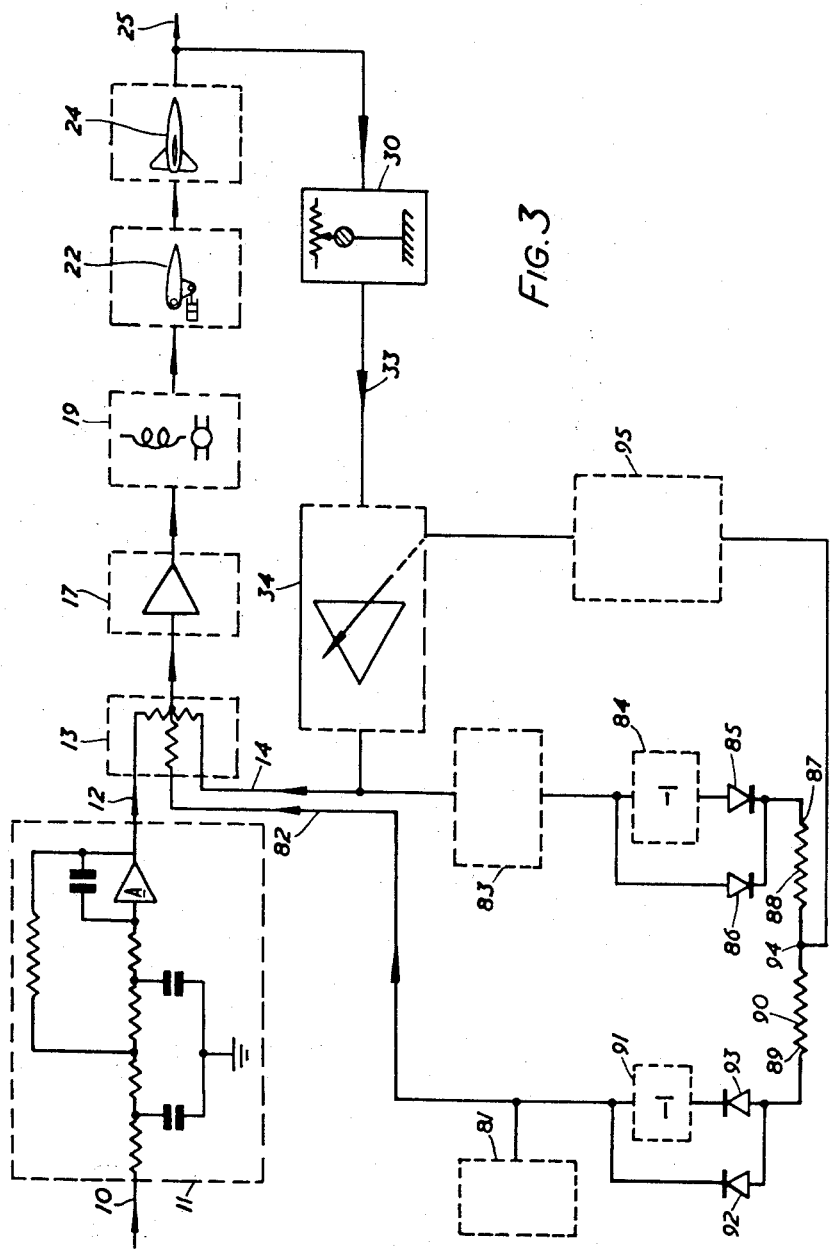
Figure 3 is a block diagram of a modified servo-system.

In a modificaion of this arrangement, shown in Figure 3, the forward and feed-back paths of the feed-back loop are the same as those described in relation to Figure 1; thus a demand signal 10 passes through a low pass filter 11, whence the filtered output is supplied as one input 12 of an adding unit 13. The signal from the adding unit after passing through an amplifier 17 operates a valve 19 to actuate the rudder 22. The resulting deflection of the rudder, produces a lateral acceleration of the aircraft 24 represented by the output 25, which is measured by the accelerometer 30. The resulting output 33 from the accelerometer is amplified by the variable gain amplifier 34 and is fed back as an input 14 to the adding unit 13.

A small amplitude oscillation close in frequency to the self-oscillation frequency of the loop is generated by an oscillator 81 and is injected into the loop as an input 82 to the adding unit 13 and this oscillation passes completely round the loop comprising the units 13, 17, 19, 22, 24, 30 and the variable gain amplifier 34. The output from variable gain amplifier, in addition to being passed as the feed back signal 14 to the adding unit 13 is fed through a band pass filter 83 which is designed to pass a narrow band of frequencies including the oscillator frequency and which has a transfer function of the form $$\frac{p}{1+dp+p^2}$$

The output from the band pass filter is full-wave rectified by means of a phase inverter 84 and two diodes 85 and 86. The resulting D.C. voltage passes to one end 87 of a resistor 88. A D.C. signal in the opposite sense is supplied to one end 89 of a second resistor 90 from the oscillator 81 to which it is connected through a full-wave rectification circuit comprising a phase inverter 91 and two diodes 92 and 93. The other ends of the resistors 88 and 90 are connected together at a point 94 whence any out of balance signal is passed to a smoothing and phase advance filter 95 which has a transfer function of the form:

$$\left(\frac{1}{1+pT_1}+\frac{Bp}{1+cp+dp^2}\right)\frac{1}{1+pT_2}$$

The output from the filter 95 is supplied to the variable-gain feed back amplifier 34 to control its gain.

This modification of the basic arrangement illustrated in Figure 1 enables the gain of the loop at or near the self-oscillation frequency to be set at a desired value less than unity (determined by the ratio of the resistors 88 and 90). In this arrangement the gain will normally be set to between 0.5 and 0.75 to enable the system to accept a wider range of input frequencies.

It is not necessary that the injected signal should be at the self-oscillation frequency for the gain at another frequency may be related to that at the self-oscillation frequency and if a signal of this other frequency is injected the loop gain at that frequency can be maintained at the value for which the loop-gain at the self-oscillation frequency is at the desired value below unity.

In this way it is not necessary for the useful output to be oscillatory before the control can come into operation.

In a further modification the system includes a network which modifies the system characteristics so that the first self-oscillation frequency is far removed from the operating range of frequencies, and in the region of this frequency the loop gain varies but little with frequency.

What I claim as my invention and desire to secure by Letters Patent is:

1. A feed-back control system designed to operate over a range of working frequencies, including a variable-gain element in the feed-back loop, and a sensing element responsive to the loop gain of signals in the loop at a sensing frequency outside the working range, the sensing element being arranged to control the variable gain element so as to reduce the loop gain at both operating and sensing frequencies when the loop gain at the sensing frequency rises.

2. A system as claimed in claim 1 in which means is provided for injecting a signal at sensing frequency into the loop and for withdrawing a similar signal from the loop after passing completely round the loop, and in which the sensing element comprises means for comparing the two signals and controlling the variable gain element in accordance with their relationship.

3. A system as claimed in claim 2 in which the signal is injected into the loop at the same point as the demand signal enters the loop and is withdrawn from the fed-back path.

4. A system as claimed in claim 3 including an oscillator for producing the signal at sensing frequency, means for rectifying the signal from the oscillator, a band-pass filter arranged to pass signals of the oscillator frequency, means for passing the signal withdrawn from the loop though the band-pass filter, means for rectifying the signal passed by the band-pass filter, and an adding unit for comparing the two rectified signals and causing the resultant to control the variable gain unit.

5. A system as claimed in claim 1 in which the sensing frequency is a frequency at which the loop tends to oscillate.

6. A system as claimed in claim 5 in which the sensing element is arranged to respond to oscillation so as to reduce the gain of the variable gain element when the loop gain at the sensing frequency exceeds unity and oscillation builds up.

7. A feed-back control system including a variable-gain element controlled by a unit responsive to oscillations in the feed-back loop to reduce the loop gain to tend to keep it at the value at which oscillations remain small.

8. A system as claimed in claim 7 in which the variable gain element is in the forward part of the loop.

9. A system as claimed in claim 7 in which the variable gain element is in the feed-back part of the loop.

10. A system as claimed in claim 7 in which the variable-gain element is a variable-gain amplifier, and the unit includes means for extracting a signal from the loop, a band-pass filter through which the signal is passed and which serves to pass the oscillation frequency of the loop, and means for rectifying and smoothing the output from the filter and causing it to control the variable-gain unit.

11. A system as claimed in claim 10 in which the control signal is directly proportional to the oscillation amplitude.

12. A system as claimed in claim 7 in which the control signal comprises an integral of the oscillation amplitude.

13. A system as claimed in claim 7 including an input filter arranged to reject input signals at the oscillation frequency.

14. A servo system for the control of an aircraft which includes a forward path including a forward amplifier and a control surface actuated in accordance with the output of the amplifier, and a feed-back path including an accelerometer responding to lateral accelerations of the craft produced by deflection of the control surface, a feed-back amplifier having its input connected to the output of the accelerometer and its output connected to an input of the forward amplifier as a feed-back, characterised by means for varying the gain of the feed-back amplifier automatically in such manner as to keep the total loop gain substantially constant in spite of variation of the forward gain due for example to variation of lateral acceleration for a given deflection of the control surface.

15. A system as claimed in claim 14 including means for limiting the input signal to a predetermined value.

References Cited in the file of this patent

UNITED STATES PATENTS

| | | |
|---|---|---|
| 2,450,907 | Newton et al. | Oct. 12, 1948 |
| 2,730,573 | Sedgfield et al. | Jan. 10, 1956 |
| 2,745,614 | Bennett et al. | May 15, 1956 |
| 2,752,433 | White et al. | June 26, 1956 |